United States Patent [19]

Hart

[11] 4,025,697
[45] May 24, 1977

[54] APPARATUS FOR CIRCULATING ELECTROLYTE AROUND MULTI-SECTION BATTERIES

[75] Inventor: Thomas G. Hart, Royal Oak, Mich.

[73] Assignee: Energy Development Associates, Madison Heights, Mich.

[22] Filed: Oct. 29, 1975

[21] Appl. No.: 626,792

[52] U.S. Cl. .................................... 429/70; 429/18
[51] Int. Cl.² ......................................... H01M 2/40
[58] Field of Search ............... 136/160, 83 R, 86 B, 136/6 R; 429/70, 18, 15

[56] References Cited

UNITED STATES PATENTS

| 3,713,888 | 1/1973 | Symons | 136/6 R |
| 3,773,559 | 11/1973 | Warszawski et al. | 136/86 B |

FOREIGN PATENTS OR APPLICATIONS

| 14,729 | 7/1969 | Japan | 136/160 |

*Primary Examiner*—Donald L. Walton
*Attorney, Agent, or Firm*—Ostrolenk, Faber, Gerb & Soffen

[57] ABSTRACT

A two-stage electrolyte circulation system for a multi-cell battery in which a large pump distributes the electrolyte through hydraulically driven circulators to the individual cells.

5 Claims, 2 Drawing Figures

APPARATUS FOR CIRCULATING ELECTROLYTE AROUND MULTI-SECTION BATTERIES

BACKGROUND OF THE INVENTION

1. Field of Invention

This invention relates to an apparatus for circulating and distributing an electrolyte through a multisection battery.

2. Description of the Prior Art

Battery systems are well known which ultilize a circulating electrolyte such as a metallic halogen; zinc-chloride, for example. Such a battery system is illustrated in U.S. Pat. No. 3,713,888 issued to the same assignee as the present invention. The electrolyte is generally pumped through the system and to electrodes at which an ionic exchange occurs and a potential difference is created across the electrodes. This source of energy can be used to electrically power motor vehicles or serve as a standby power reserve and in many other situations where electrical energy is needed for a long-term use.

There are three major difficulties associated with circulating electrolyte around an electrochemical battery. First, the electrolyte is usually highly corrosive, for example, in the zinc-chloride system the electrolyte is zinc chloride and is commonly circulated containing free and dissolved chlorine. Second, in multi-section batteries containing more than one cell, conductivity of the electrolyte is usually high enough so that electrical leakage from one cell to another occurs producing electric shorting circuits flowing in the electrolyte which substantially increase intercell power losses. In a zinc-chlorine battery operating at 250 volts, the single circulation path ½ inch in diameter and 12 inches long bridging the entire battery cell structure has been observed to result in a power loss of as much as 300 watts due to electrical leakage along the circulation path. Because of the leakage problem from one cell to another, the design of circulation paths in electrochemical batteries has become a critical factor. Third, the circulation requirement for the electrolyte in the battery is usually for relatively high flow rates at relatively low pressure drops. This requirement is conventionally met by relatively cumbersome pumping devices. In the zinc-chlorine system, chlorine is commonly delivered to the battery cells in solution in the zinc chloride electrolyte requiring that the battery cells be fed with electrolyte in parallel rather than in series. A typical flow rate of 40 gallons per minute at a pressure drop of 2 pounds per square inch is used.

In conventional battery systems, particularly those designed for mobile use where space and weight are at a premium, the combination of the above difficulties leads to a number of unsatisfactory compromises between weight, volume, power efficiency and reliability. For example, the corrosive nature of the electrolyte requires that the use of mechanical seals and magnetic couplings be held to a minimum. The high-flow, low-pressure drop requirement leads to low speed, high torque electrolyte circulating devices which tend to be heavy, are cumbersome and rely on magnetic couplings and motors for their operation. The electrical leakage problem leads to subdividing the circulation system into a number of electrically isolated cells with the provision of a sequenced valve arrangement so that electrolyte only flows to one of the cells at a time, each cell being supplied with electrolyte in turn by sequenced opening of the valve. Such a cumbersome system is shown in British Pat. No. 1,249,308. Furthermore, even compromising these difficulties, reduction in weight and size of the circulating system is only possible by sacrificing power efficiency.

SUMMARY OF THE INVENTION

The circulating system in accordance with the present invention provides a much better solution to the various problems associated with the design of a high-flow, multiple-section, circulating electrolyte battery system.

In particular, electrolyte is distributed in a two-stage system in which a large pump (first stage) distributes the electrolyte through hydraulically driven circulators (second stage) to individual electrodes compartments, which are electrically isolated from each other. This results in minimizing inter-cell leakage. No rotating mechanical seals and only a single magnetic coupling is provided to circulate the electrolyte. This is achieved in the two-stage pumping system where an electric motor has the only magnetic coupling to drive the pump. The first stage large pump generates a relatively high-pressure, low flow rate of electrolyte fluid, but the second stage including the circulators which distribute the electrolyte to the individual cells, are designed to generate a relatively low-pressure, high-flow rate of the electrolyte. This conversion of relatively low-flow, relatively high-pressure to relatively high-flow, relatively low-pressure in the circulators feeding the individual cells allows for higher overall efficiency and power use. Furthermore, the system lends itself to the pump and circulators being constructed of non-corrosive parts, mainly of polyvinyl chloride or polypropylene, except where bearing surfaces are required, and then these can be manufactured from ceramic and carbon. The connections of the various conduits can also be made of polyvinyl chloride or polypropylene with Viton rubber gaskets for sealing the couplings.

Further advantages of the invention will become more apparent from the following specification and claims, and from the accompanying drawings wherein:

DESCRIPTION OF THE PREFERRED EMBODIMENT

Figure 1:
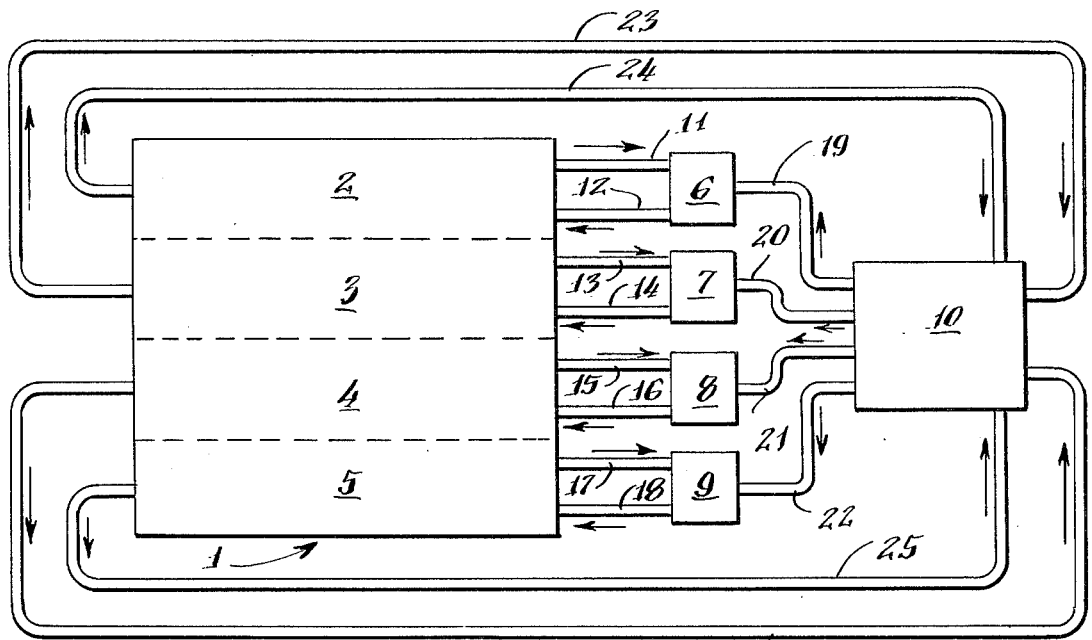
FIG. 1 is a diagrammatic illustration of a battery system including the circulation system of the present invention.

Referring now to the drawings in detail wherein like numerals indicate like elements throughout the several views, FIG. 1 diagrammatically illustrates a battery system in accordance with the present invention.

The battery system includes a battery 1 which is divided internally into four electrically isolated sections or cells designated 2, 3, 4 and 5, respectively. Circulators 6, 7, 8 and 9 circulate electrolyte in a closed loop through cells 2, 3, 4 and 5, respectively.

Typical circulator 6 circulates electrolyte through a conduit 12 into cell 2, and back out of the cell to the circulator 6 through a conduit 11. Circulators 7, 8 and 9 operate in an identical manner.

Electrolyte is pumped to each of the circulators 6, 7, 8 and 9 and through the entire system by a centrifugal pump 10 connected to each circulator 6, 7, 8 and 9 by a conduit 19, 20, 21 and 22, respectively. Electrolyte is recirculated from each of the cells to the pump 10 through conduits 23, 24, 25 and 26.

Considering battery section 2 as typical and assuming that the entire system is full of liquid electrolyte, the operation of the battery system of FIG. 1 is as follows: pump 10 drives electrolyte through conduit 19 into circulator 6 at, for example, a pressure of 20 pounds per square inch at a rate of 2 gallons per minute. Within circulator 6, by means which are described in greater detail hereinafter, the flow of the electrolyte from pump 10 is substantially converted into flow of electrolyte circulating around the battery-flow-loop formed by circulator 6, outlet conduit 11, battery section 2, and inlet conduit 12 at about 10 gallons per minute with a pressure drop of about 2 pounds per square inch around the flow loop. The electrolyte being driven into circulator 6 and thence into battery section 2 by pump 10 will displace an equal volue of electrolyte from battery section 2 through conduit 24 and back to the inlet of pump 10.

Since the battery sections 2, 3, 4 and 5 illustrated in FIG. 1 are electrically isolated one from another within the battery itself, electrical leakage between sections 2, 3, 4 and 5 is confined to leakage through the electrolyte within conduits 19, 20, 21 and 22 which have a common origin at pump 10 and the conduits 23, 24, 25 and 26 which all meet back at the inlet to pump 10.

Figure 2:
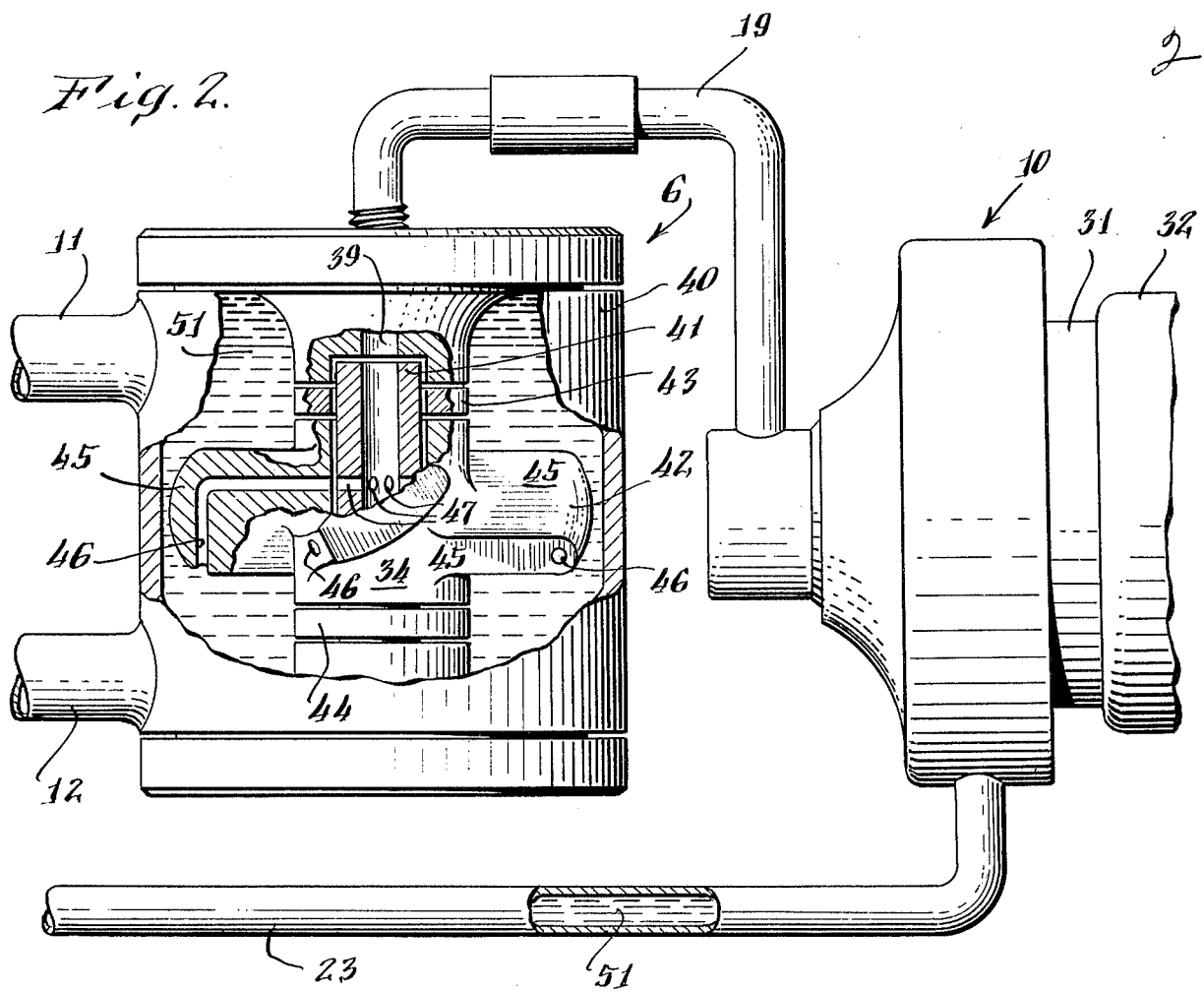
FIG. 2 is a side view in elevation of a portion of the system illustrated in FIG. 1, with portions broken away to illustrate the interior components of a second circulator for distributing the electrolyte to each individual cell of the system illustrated in FIG. 1.

FIG. 2 illustrates a working embodiment of the pump 10 with the typical circulator 6. Pump 10 is a conventional type centrifugal pump which is magnetically coupled by a conventional coupling 31 to an electric motor 32.

Circulator 6 includes a housing 40 having an outlet conduit 12 and an inlet conduit 11 adapted to be connected to one of the electrically isolated cells of the battery. Conduit 19 connects the outlet of pump 10 to the inlet 39 of housing 40. A hollow stationary shaft 41 is positioned within housing 40 in line with conduit 19 to provide electrolyte 51 to the interior of the housing. An impeller 42 has its hub rotatably mounted about shaft 41 between stationary end bearings 43 and 44.

The impeller 42 includes a plurality of curved vanes 45 radially extending from its hub. Each vane 45 includes a passageway 46 which extends radially outward from shaft 41 and then downwardly opening into the interior of the housing 40. Each passageway 46 is in line with an opening 47 formed through the wall of hollow shaft 41 thereby communicating with the interior of the hollow shaft.

In a zinc-chlorine battery system where corrosion problems are severe, pump 10 and circulator 6 are formed of polyvinyl chloride or polypropylene except for the bearing surfaces, which are either ceramic or carbon. Conduits 11, 12 and 19 and their associated fittings are also made of polyvinyl chloride or polypropylene with Viton rubber gaskets for sealing the couplings.

The operation of the assembly illustrated in FIG. 2, is as follows:

Electrolyte 51 returning from the battery through a typical conduit 23 enters centrifugal pump 10 and is centrifugally impelled at a pressure of about 20 pounds per square inch into and along conduit 19, and thence through inlet 39 of housing 40 of circulator 6. Electrolyte 51 is forced through hollow shaft 41, out holes 47, and into the passageways 46 in each of the vanes 45 of the impeller 42. Upon leaving the impeller and entering the interior of housing 40, the issuing jet of electrolyte 51 from each of vanes 45 causes a force to be exerted on the curved vane surfaces to rotate it in the electrolyte 51 within the housing 40. This will cause rotation of impeller 42 and vanes 45, between the stationary bearings 43 and 44, at a rate sufficient to circulate the electrolyte 51 around the battery flow-loop formed by circulator 6, the battery cell and the conduits 11 and 12 at a flow rate of about 10 gallons per minute with a pressure drop of about two pounds per square inch around this loop.

In a typical situation wherein a battery system was constructed using 8 circulators and a pump with interconnecting conduits as shown in FIGS. 1 and 2, the system weighed 50 pounds and occupied 1200 cubic inches and had an overall power efficiency of 40%. In contrast, a comparable conventional system around the same eight section battery has the following typical specifications: 3 mechanical seals or magnetic couplings, weight of about 100 pounds occupying 2000 cubic inches and an overall power efficiency of 25%.

What is claimed is:

1. An apparatus for circulating electrolyte in a multi-section battery having a plurality of electrically isolated cells comprising:
    a plurality of electrically isolated cells,
    pump means having an inlet and an outlet for forcing electrolyte through the cells of said battery,
    means between each of the individual cells of said battery and the outlet of said pump means for circulating said electrolyte in a closed loop through each of said individual cells,
    conduit means between the outlet of said pump means and said circulating means, and
    conduit means between each of said individual cells and the inlet to said pump means for recycling said electrolyte.

2. Apparatus in accordance with claim 1 wherein said closed loop includes said circulating means, a cell of said battery, and conduit means extending between said cell and said circulating means.

3. Apparatus in accordance with claim 2 wherein said circulating means includes
    a housing having
        an electrolyte inlet
        a hollow shaft in communication with said inlet
        an impeller rotatably mounted in said housing on said hollow shaft, said impeller including
            a hub mounted for rotation on said hollow shaft,
            a plurality of vanes extending radially from said hub,
            an elctrolyte passage in each of said vanes communicating with the interior of said hollow shafts, and
        an electrolyte outlet,
    whereby electrolyte forced into said housing through said inlet will enter said hollow shaft and will flow through said electrolyte passageways in said vanes to cause rotation of said vanes to force electrolyte within said housing out said outlet.

4. Apparatus for circulating fluids around an electrochemical battery comprising said battery and a two-stage pumping means, the first stage comprising a means for generating a relatively high pressure, low flow-rate of fluids to the second stage, the second stage comprising a means for generating a relatively low pressure, high flow rate of fluids to said battery, said second stage being hydraulically driven by said first stage.

5. Apparatus in accordance with claim 4 wherein said first stage pumping means comprises an electroltye pump, and said second stage pumping means comprises an electrolyte circulator fed electrolyte by said pump and hydraulically driven by said electrolyte to force said electrolyte to said battery.

* * * * *